United States Patent
Kim et al.

(10) Patent No.: US 12,434,550 B2
(45) Date of Patent: Oct. 7, 2025

(54) COOLING SYSTEM FOR IN-WHEEL MOTOR VEHICLES

(71) Applicants: Hyundai Motor Company, Seoul (KR); Kia Corporation, Seoul (KR)

(72) Inventors: Yeon Ho Kim, Seoul (KR); Su Whan Kim, Hwaseong-si (KR); Ho Young Jeong, Hwaseong-si (KR); Hwang Hi Park, Seongnam-si (KR); Jae Yeon Kim, Hwaseong-si (KR); Sang Moon Cho, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 297 days.

(21) Appl. No.: 18/360,428

(22) Filed: Jul. 27, 2023

(65) Prior Publication Data
US 2024/0399849 A1    Dec. 5, 2024

(30) Foreign Application Priority Data

May 30, 2023    (KR) ........................ 10-2023-0068872

(51) Int. Cl.
*B60K 7/00*    (2006.01)
*B60H 1/00*    (2006.01)
(Continued)

(52) U.S. Cl.
CPC ............ *B60K 7/0007* (2013.01); *B60K 11/04* (2013.01)

(58) Field of Classification Search
CPC .. B60K 11/02; B60K 11/04; B60K 2001/003; B60K 2001/005; B60K 2001/006;
(Continued)

(56) References Cited

U.S. PATENT DOCUMENTS 9,487,092 B2    11/2016    Yamada et al.
10,938,278 B2    3/2021    Tominaga et al.
(Continued)

FOREIGN PATENT DOCUMENTS

JP    2009241911 A    10/2009
JP    2011114947 A  *  6/2011    .............. B60L 15/20
(Continued)

*Primary Examiner* — Tinh Dang
(74) *Attorney, Agent, or Firm* — Slater Matsil, LLP

(57) ABSTRACT

An embodiment cooling system for in-wheel motor vehicles includes first coolant flow paths provided in in-wheel motors mounted in wheels of a vehicle, second coolant flow paths provided in inverters configured to drive and control the in-wheel motors, a radiator configured to pass therethrough a coolant having cooled the inverters and the in-wheel motors to dissipate heat from the coolant, a coolant circulation line connecting the first and second coolant flow paths and the radiator, wherein a portion of the coolant circulation line located at upstream sides of the inverters based on a coolant circulation path is branched off into secondary coolant circulation lines respectively connected to the inverters, and water pumps disposed on the coolant circulation line and configured to pump the coolant, wherein the coolant pumped by the water pumps is distributed and passes through the inverters in parallel by way of the secondary coolant circulation lines.

20 Claims, 9 Drawing Sheets

(51) Int. Cl.
    *B60K 11/02*       (2006.01)
    *B60K 11/04*       (2006.01)
    *F01P 5/10*        (2006.01)

(58) Field of Classification Search
    CPC .............. B60K 7/0007; B60H 1/00271; B60H
            1/00278; B60H 2001/00307; B60L 58/26;
            B60Y 2200/91; B60Y 2306/05; B60Y
                                     2400/61
    See application file for complete search history.

(56) References Cited

U.S. PATENT DOCUMENTS

2013/0161104 A1     6/2013   Akamatsu
2016/0297293 A1*  10/2016  Ito ........................... B60K 1/04

FOREIGN PATENT DOCUMENTS

| | | | |
|---|---|---|---|
| JP | 2017100700 A | 6/2017 | |
| JP | 2020147069 A | 9/2020 | |
| WO | WO-2022131007 A1 * | 6/2022 | ............. H02K 9/193 |

\* cited by examiner

COOLING SYSTEM FOR IN-WHEEL MOTOR VEHICLES

CROSS-REFERENCE TO RELATED APPLICATIONS

This application claims the benefit of Korean Patent Application No. 10-2023-0068872, filed on May 30, 2023, which application is hereby incorporated herein by reference.

TECHNICAL FIELD

The present disclosure relates to a cooling system for in-wheel motor vehicles.

BACKGROUND

An electric vehicle is an eco-friendly vehicle which does not emit exhaust gas. In such an electric vehicle, a high voltage battery configured to supply energy for driving the vehicle, an inverter configured to convert DC output from the high voltage battery into AC, a motor configured to receive the AC supplied from the inverter and to generate rotational force to drive the vehicle, and the like are essentially mounted.

It is well known that a currently commercialized powertrain for electric vehicles is configured such that power (rotational force) of a motor is reduced by a reducer and is then transmitted to wheels (vehicle wheels) through drive shafts so as to drive a vehicle.

In addition, an in-wheel motor (IWM) system in which a motor is installed in a rim of a wheel on which a tire is mounted so that power of the motor is directly transmitted to the wheel is in the spotlight. In an electric vehicle in which in-wheel motors are mounted, an intermediate power transmission device, such as a reducer or a differential gear, is omitted, and thus, the weight of the vehicle may be reduced.

Further, a space occupied by the power train in the vehicle is greatly reduced due to omission of some devices, and there is an advantage of reducing energy loss during a power transmission process (fuel economy improvement).

Moreover, research and development on an electronic corner (e-Corner) module, obtained by combining a wheel, an in-wheel motor which is a driving device, an inverter, a braking system, a steering system, and a suspension system, is actively underway.

When the e-Corner module is applied to a vehicle, the e-Corner module itself functions as a driving device which may independently steer a corresponding wheel and wheel responsiveness and driving stability may be improved. Further, the respective wheels of the vehicle may be independently controlled to be driven and steered, and thus, when the vehicle turns, the turning radius of the vehicle may be greatly reduced.

The in-wheel motor mounted in the wheel of the vehicle generates Joule heat due to resistance while current flows in a coil of a stator, and the heat generated by the in-wheel motor raises the temperature of components of the in-wheel motor and thus greatly shortens the expected lifespan of the in-wheel motor. As such, the heat generated by the in-wheel motor has a negative influence on performance and durability of the motor, and therefore, it is necessary to properly cool the in-wheel motor.

In the vehicle in which the in-wheel motors are mounted, i.e., an in-wheel motor vehicle, there is a plurality of heat sources in each of the wheels of the vehicle, and for example, a braking system, a tire, and the like may function as the heat sources. That is, when the vehicle is braked, heat generated due to friction between a pad and a friction member in the braking system may be transmitted to the in-wheel motor, and, when the vehicle is driving, heat generated by the tire due to friction with a road surface may be transmitted to the in-wheel motor.

Therefore, it is necessary to configure a cooling system optimal to the in-wheel motor mounted in each of wheels in consideration of several varied factors in such an in-wheel motor vehicle.

Conventionally, in order to cool the in-wheel motor, a method in which, when heat is conducted to a motor housing, the heat is dissipated through heat transfer by convection with external air in the motor housing is known, but this method greatly reduces cooling efficiency.

In addition, a method of cooling the in-wheel motor using oil is known, but such an oil cooling method requires a device configured to cool the oil after cooling the in-wheel motor, i.e., a separate oil cooler.

The above information disclosed in this background section is only for enhancement of understanding of the background of embodiments of the invention and therefore it may contain information that does not form the prior art that is already known to a person of ordinary skill in the art.

SUMMARY

The present disclosure relates to a cooling system for in-wheel motor vehicles. Particular embodiments relate to a cooling system for in-wheel motor vehicles which may effectively cool in-wheel motors mounted in respective wheels of a vehicle together with inverters using a coolant.

Embodiments of the present invention can solve problems associated with the prior art, and embodiments of the present invention provide a cooling system for in-wheel motor vehicles which has the configuration of a water cooling-type cooling circuit configured to effectively cool in-wheel motors mounted in respective wheels of a vehicle together with inverters using a coolant.

An embodiment of the present invention provides a cooling system for in-wheel motor vehicles, including coolant flow paths provided in a plurality of in-wheel motors mounted in wheels of a vehicle, coolant flow paths provided in a plurality of inverters configured to drive and control the in-wheel motors, a radiator provided to pass a coolant having cooled the plurality of inverters and the in-wheel motors therethrough so as to dissipate heat from the coolant, a coolant circulation line provided to connect the coolant flow paths of the plurality of inverters, the coolant flow paths of the in-wheel motors, and the radiator so as to circulate the coolant thereamong, and water pumps configured to pump the coolant on the coolant circulation line so as to circulate the coolant along the coolant circulation line, wherein the coolant circulation line located at upstream sides of the inverters based on a coolant circulation path is branched off into coolant circulation lines connected to the respective inverters so that the coolant pumped by the water pumps is distributed and passes through the plurality of inverters in parallel.

In a preferred embodiment, the plurality of in-wheel motors may be connected in series by the coolant circulation line, into which the coolant circulation lines connected to the respective inverters are joined again, so that the coolant having passed through the plurality of inverters in parallel sequentially passes through the plurality of in-wheel motors mounted in the wheels of the vehicle while being circulated along the coolant circulation line, into which the coolant circulation lines connected to the respective inverters is joined again.

In another preferred embodiment, the coolant circulation line configured to connect the plurality of in-wheel motors in series may be connected to the radiator, and the radiator may be disposed at downstream sides of the plurality of in-wheel motors based on the coolant circulation path.

In still another preferred embodiment, the plurality of in-wheel motors may include an in-wheel motor of a left wheel of the vehicle and an in-wheel motor of a right wheel of the vehicle, and the plurality of inverters may include a left wheel inverter configured to drive and control the in-wheel motor of the left wheel and a right wheel inverter configured to drive and control the in-wheel motor of the right wheel.

In yet another preferred embodiment, the plurality of in-wheel motors may include in-wheel motors of front wheels of the vehicle and in-wheel motors of rear wheels of the vehicle, and the plurality of inverters may include a front wheel inverter configured to drive and control the in-wheel motors of the front wheels and a rear wheel inverter configured to drive and control the in-wheel motors of the rear wheels.

In still yet another preferred embodiment, the in-wheel motors of the front wheels may include an in-wheel motor of a front left wheel and an in-wheel motor of a front right wheel, and the in-wheel motors of the rear wheels may include an in-wheel motor of a rear left wheel and an in-wheel motor of a rear right wheel.

In a further preferred embodiment, the water pumps may include a first water pump disposed at upstream sides of the plurality of inverters and a second water pump installed on the coolant circulation line located between the in-wheel motors of the front wheels and the in-wheel motors of the rear wheels.

In another further preferred embodiment, the water pumps may include a first water pump disposed at upstream sides of the plurality of inverters and a second water pump disposed at downstream sides of the plurality of inverters so as to pump the coolant having passed through the plurality of inverters.

In still another further preferred embodiment, the cooling system may further include a water cooling-type heat exchanger provided to perform heat exchange between the coolant circulated along the coolant circulation line and a refrigerant circulated along a refrigerant circulation line of an air conditioning system and a heat pump system.

In yet another further preferred embodiment, the water pumps may include a first water pump disposed at upstream sides of the plurality of inverters and a second water pump installed on the coolant circulation line located at an upstream side of the water cooling-type heat exchanger.

In still yet another further preferred embodiment, the water cooling-type heat exchanger may be disposed at an upstream side of the radiator.

In a still further preferred embodiment, the water pumps may include a first water pump disposed at upstream sides of the plurality of inverters and a second water pump installed on the coolant circulation line located at an upstream side of the water cooling-type heat exchanger.

In a yet still further preferred embodiment, the water cooling-type heat exchanger may be disposed at a downstream side of the radiator.

In still another further preferred embodiment, the water pumps may include a first water pump disposed at upstream sides of the plurality of inverters and a second water pump installed on the coolant circulation line located at an upstream side of the radiator.

In yet another further preferred embodiment, a connection line branched off from the coolant circulation line located at an upstream side of the radiator may be connected to a chiller, a three-way valve configured to allow the coolant to flow in one direction towards the radiator or the chiller may be installed at a branch point where the connection line is branched off from the coolant circulation line, a refrigerant line may be connected to the chiller so as to allow an air conditioner refrigerant to pass through the chiller, and heat exchange between the air conditioner refrigerant introduced into the chiller through the refrigerant line and the coolant introduced into the chiller through the connection line may be performed in the chiller.

In still yet another further preferred embodiment, a coolant circulation line of a battery cooling circuit configured to cool a battery may be connected to the chiller, and heat exchange between a coolant circulated along the battery circulation line of the battery cooling circuit and the air conditioner refrigerant may be performed in the chiller.

In a still further preferred embodiment, an expansion valve configured to expand the air conditioner refrigerant may be disposed on the refrigerant line configured such that the air conditioner refrigerant is introduced into the chiller therethrough.

In a yet still further preferred embodiment, each of the water pumps may be installed on a corresponding one of the coolant circulation lines connected to the respective inverters.

Other aspects of preferred embodiments of the invention are discussed infra.

The above and other features of embodiments of the invention are discussed infra.

BRIEF DESCRIPTION OF THE DRAWINGS

The above and other features of embodiments of the present invention will now be described in detail with reference to certain exemplary embodiments thereof illustrated in the accompanying drawings which are given hereinbelow by way of illustration only, and thus are not limitative of embodiments of the present invention, and wherein.

Figure 1:
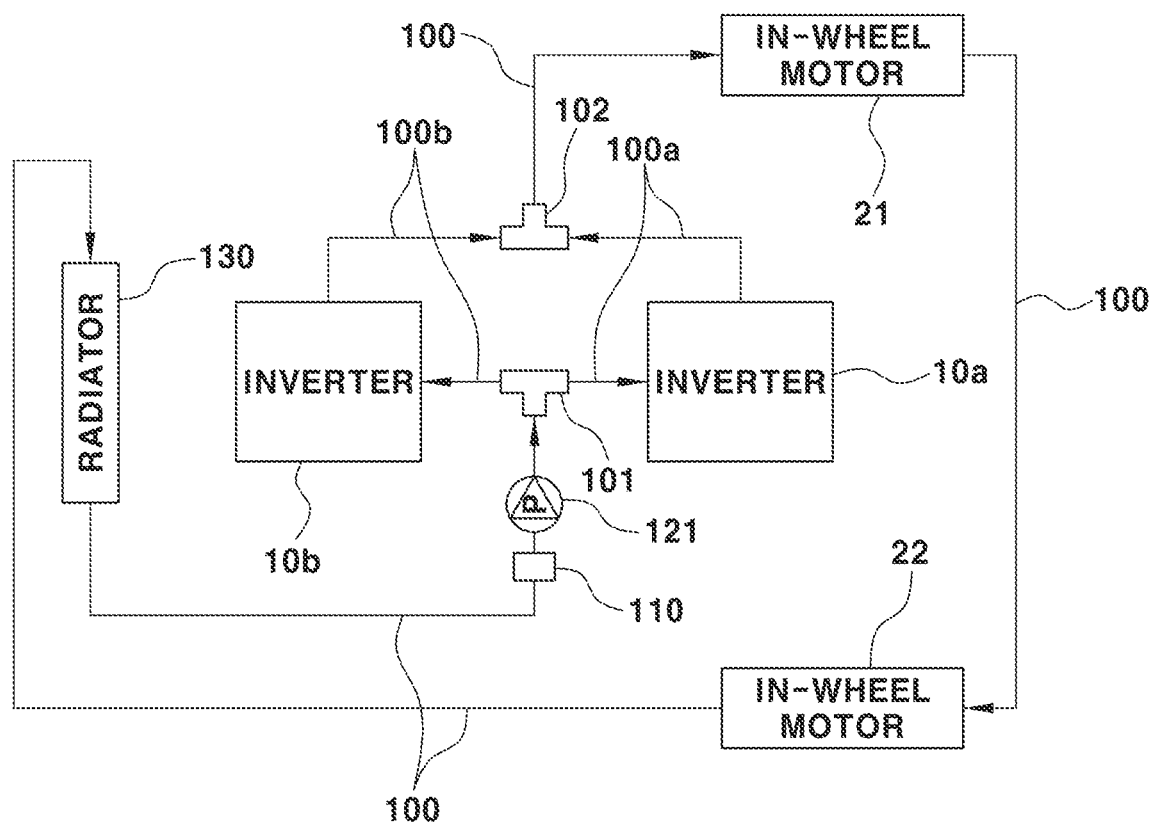
FIG. 1 is a circuit diagram showing a cooling system for in-wheel motor vehicles according to a first embodiment of the present invention.

It should be understood that the appended drawings are not necessarily to scale, presenting a somewhat simplified representation of various preferred features illustrative of the basic principles of embodiments of the invention. The specific design features of embodiments of the present invention as disclosed herein, including, for example, specific dimensions, orientations, locations, and shapes, will be determined in part by the particular intended application and use environment.

In the figures, reference numbers refer to the same or equivalent parts of embodiments of the present invention throughout the several figures of the drawings.

DETAILED DESCRIPTION OF ILLUSTRATIVE EMBODIMENTS

Hereinafter reference will be made in detail to various embodiments of the present invention, examples of which are illustrated in the accompanying drawings and described below. Specific structural or functional descriptions in embodiments of the present invention set forth in the description which follows will be exemplarily given to describe the embodiments of the present invention, and embodiments of the present invention may be embodied in many alternative forms. Further, it will be understood that the embodiments of the present invention should not be construed as being limited to the embodiments set forth herein, and the embodiments of the present invention are provided only to completely disclose the embodiments of the invention and cover modifications, equivalents, or alternatives which come within the scope and technical range of the invention.

In the following description of the embodiments, terms, such as "first" and "second," are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of embodiments of the invention.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

Wherever possible, the same reference numbers will be used throughout the drawings to refer to the same or like parts. The terminology used herein is for the purpose of describing particular embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, operations, elements, components, and/or combinations thereof, but do not preclude the presence or addition of one or more other features, integers, operations, elements, components, and/or combinations thereof.

A thermal management system of a vehicle includes an air conditioning system including a compressor, an external condenser, an expansion valve, an evaporator, and a refrigerant circulation line, a cooling system including a radiator, a water pump, and a coolant circulation line, and a heat pump system configured to heat the interior of the vehicle using the refrigerant of the air conditioning system. Thereamong, the cooling system is a water cooling-type cooling system and cools electrical and electronic components, such as inverters, in-wheel motors, and the like which are mounted in the vehicle, and a battery.

Figure 2:
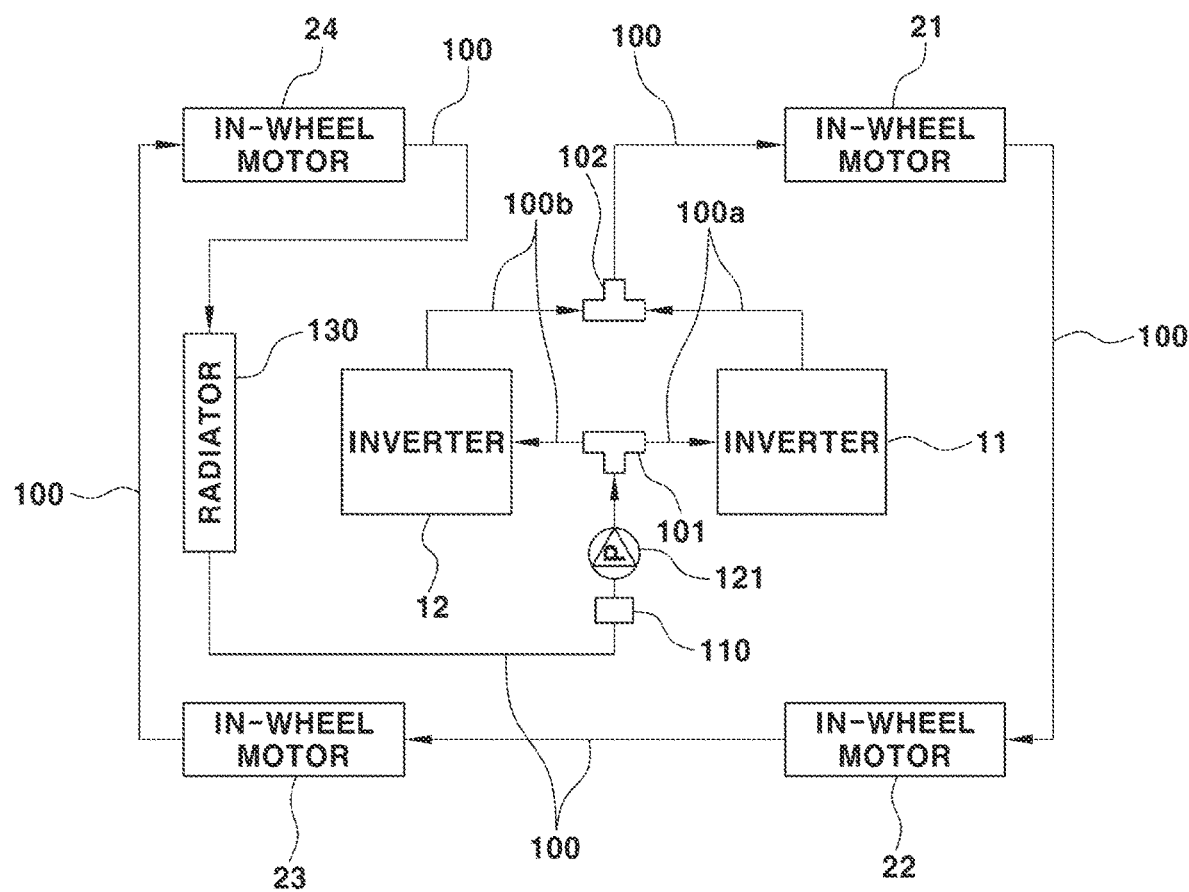
FIG. 2 is a circuit diagram showing a cooling system for in-wheel motor vehicles according to a second embodiment of the present invention.

FIG. 1 is a circuit diagram showing a cooling system for in-wheel motor vehicles according to a first embodiment of the present invention, and FIG. 2 is a circuit diagram showing a cooling system for in-wheel motor vehicles according to a second embodiment of the present invention.

FIG. 1 shows two in-wheel motors 21 and 22 respectively mounted in two wheels of a vehicle. The two in-wheel motors 21 and 22 may be in-wheel motors mounted in a right wheel and a left wheel of the vehicle, and the right wheel and the left wheel may be a front right wheel and a front left wheel or a rear right wheel and a rear left wheel.

Further, as shown in this figure, a plurality of inverters configured to drive and control the in-wheel motors 21 and 22 may be mounted and, in the first embodiment, two inverters 10a and 10b may be a right wheel inverter 10a and a left wheel inverter 10b.

The left wheel inverter 10b converts direct current (DC) output from a battery (not shown) to alternating current (AC) and applies AC to the in-wheel motor 22 of the left wheel, and the right wheel inverter 10a converts DC output from the battery to AC and applies AC to the in-wheel motor 21 of the right wheel.

For this purpose, the left wheel inverter 10b has a power module (not shown) configured to drive and control the in-wheel motor 22 of the left wheel, and the right wheel inverter 10a has a power module (not shown) configured to drive and control the in-wheel motor 21 of the right wheel.

FIG. 2 shows four in-wheel motors 21-24 respectively mounted in four wheels of a vehicle. The four wheels may be a front right wheel, a front left wheel, a rear right wheel, and a rear left wheel, and the four in-wheel motors 21-24 may be in-wheel motors mounted in the above-described respective wheels.

In the second embodiment shown in FIG. 2, two inverters 11 and 12 may be a rear wheel inverter 11 and a front wheel inverter 12. The front wheel inverter 12 converts DC output from a battery (not shown) to AC and applies AC to the in-wheel motor 23 of the front left wheel and the in-wheel motor 24 of the front right wheel. The rear wheel inverter 11 converts DC output from the battery to AC and applies AC to the in-wheel motor 22 of the rear left wheel and the in-wheel motor 21 of the rear right wheel.

In the second embodiment shown in FIG. 2, the front wheel inverter 12 has a power module (not shown) configured to drive and control the in-wheel motor 23 of the front left wheel and the in-wheel motor 24 of the front right wheel, and the rear wheel inverter 11 has a power module (not shown) configured to drive and control the in-wheel motor 22 of the rear left wheel and the in-wheel motor 21 of the rear right wheel. The respective power modules include switching elements configured to convert DC to AC.

The in-wheel motors 21-24 and the inverters 10a, 10b, 11, and 12 shown in FIGS. 1 and 2 are devices which are operated by electric power supplied by the vehicle, generate heat when they are operated, and thus require cooling so as to secure performance and durability.

The cooling systems for in-wheel motor vehicles according to the first and second embodiments of the present invention are water cooling-type cooling systems which use a coolant circulated along coolant circulation lines 100, 100a, and 100b so as to cool the above-described devices (in-wheel motors and inverters).

These cooling systems for in-wheel motor vehicles include a power electronic (PE) cooling circuit configured to cool electrical and electronic components, such as the in-wheel motors 21-24 and the inverters 10a, 10b, 11, and 12.

Here, the PE cooling circuit includes coolant flow paths (not shown) provided in the respective in-wheel motors 21 and 22 or 21-24 and the inverters 10a and 10b or 11 and 12 such that the coolant may flow therein, and the coolant flow paths are provided such that the coolant passing through the insides of the respective in-wheel motors 21 and 22 or 21-24 and the inverters 10a and 10b or 11 and 12 may cool the corresponding devices, i.e., absorb heat generated from the corresponding devices. For example, the coolant flow paths may be configured to form passages through which the coolant may pass in housings (not shown) of the in-wheel motors 21 and 22 or 21-24 and the inverters 10a and 10b or 11 and 12.

Further, the PE cooling circuit further includes the coolant circulation lines 100, 100a, and 100b configured to interconnect the coolant flow paths of the in-wheel motors 21 and 22 or 21-24 and the inverters 10a and 10b or 11 and 12 so as to circulate the coolant, a water pump 121 configured to pump the coolant in the coolant circulation lines 100, 100a, and 100b so as to circulate the coolant, and a radiator 130 which is a heat exchanger configured to dissipate heat of the coolant circulated along the coolant circulation lines 100, 100a, and 100b.

Here, the water pump 121 may be an electric water pump operated by power supplied from the battery, and the water pump 121 is provided such that operation thereof may be controlled by a control signal from a controller, which is not shown.

Further, the radiator 130 and a cooling fan, which is not shown, form a cooling module, and the radiator 130 and the cooling fan may be installed on the front end part of the vehicle. The radiator 130 performs heat exchange between the coolant passing through the inside thereof and air passing therearound, and the coolant may be cooled by air or may absorb heat of air through such heat exchange.

In addition, the PE cooling circuit may further include a reservoir tank 110 configured to store the coolant, and the reservoir tank 110 may be disposed at the front end (the upstream side or the inlet) of the water pump 121 on the coolant circulation line 100.

In embodiments of the present invention, the coolant circulation line 100 connected to an outlet of the water pump 121, from which the coolant is discharged, is branched off into coolant circulation lines 100a and 100b by a first connector 101, and the coolant circulation lines 100a and 100b branched off from the coolant circulation line 100 by the first connector 101 are connected to the corresponding inverters 10a and 10b or 11 and 12, respectively.

For example, in the first embodiment and the second embodiment of the present invention, the coolant circulation line 100 may be branched off into the two coolant circulation lines 100a and 100b by the first connector 101, and each of the coolant circulation lines 100a and 100b branched off from the coolant circulation line 100 by the first connector 101 may be connected to a corresponding one of the two inverters 10a and 10b or 11 and 12. Here, the two coolant circulation lines 100a and 100b branched off from the coolant circulation line 100 by the first connector 101 are connected to coolant flow path inlets of the corresponding inverters 10a and 10b or 11 and 12, respectively.

Further, the coolant circulation lines 100a and 100b connected to the outlets of the inverters 10a and 10b or 11 and 12, from which the coolant having passed through the coolant flow paths is discharged, are joined into one coolant circulation line 100 by a second connector 102. The coolant circulation line 100, into which the coolant circulation lines 100a and 100b are joined by the second connector 102, connects the plurality of in-wheel motors 21 and 22 or 21-24 in series so that the coolant may sequentially pass through the plurality of in-wheel motors 21 and 22 or 21-24.

The coolant circulation lines 100a and 100b may be branched off from the coolant circulation line 100 by the first connector 101 and connected to the inverters 10a and 10b or 11 and 12 so that the coolant may be distributed at the same flow rate by the first connector 101 and flow towards the respective inverters 10a and 10b or 11 and 12.

In this case, the coolant discharged from the outlet of the water pump 121 may be distributed in a flow distribution ratio of 1:1, i.e., at the same flow rate, by the first connector 101 and the coolant circulation lines 100a and 100b, and may be supplied to the coolant flow paths of the two inverters 10a and 10b or 11 and 12.

Thereafter, the coolant having passed through the two inverters 10a and 10b or 11 and 12 in parallel flows along the one coolant circulation line 100, into which the coolant circulation lines 100a and 100b are joined by the second connector 102, and then sequentially flows towards the plurality of in-wheel motors 21 and 22 or 21-24.

As such, the PE cooling circuit is configured such that the plurality of inverters is connected in parallel through the branched coolant circulation lines, and the plurality of in-wheel motors is connected in series through the coolant circulation line.

In the first embodiment shown in FIG. 1, the coolant circulation line 100, into which the coolant circulation lines 100a and 100b are joined by the second connector 102, is connected to the inlet of the in-wheel motor 21 of the right wheel, the coolant circulation line 100 connected to the outlet of the in-wheel motor 21 of the right wheel is connected to the inlet of the in-wheel motor 22 of the left wheel, and the coolant circulation line 100 connected to the outlet of the in-wheel motor 22 of the left wheel is connected to the inlet of the radiator 130.

Therefore, the coolant circulation line 100 sequentially passes through the in-wheel motor 21 of the right wheel and the in-wheel motor 22 of the left wheel and is then connected to the radiator 130, and the coolant having cooled the inverters 10a and 10b sequentially cools the in-wheel motor 21 of the right wheel and the in-wheel motor 22 of the left wheel and then discharges heat through the radiator 130.

In the second embodiment shown in FIG. 2, the in-wheel motor 21 of the rear right wheel, the in-wheel motor 22 of the rear left wheel, the in-wheel motor 23 of the front left wheel, the in-wheel motor 24 of the front right wheel, and the radiator 130 are sequentially connected in series by the coolant circulation line 100, into which the coolant circulation lines 100a and 100b are joined by the second connector 102.

Therefore, in the second embodiment, the coolant having dissipated heat through the radiator 130 passes through the two inverters 11 and 12 in parallel to cool the inverters 11 and 12, and is then circulated along the coolant circulation line 100 in the path of the in-wheel motor 21 of the rear right wheel, the in-wheel motor 22 of the rear left wheel, the in-wheel motor 23 of the front left wheel, and the in-wheel motor 24 of the front right wheel connected in series, thereby sequentially cooling these in-wheel motors 21, 22, 23, and 24.

The above-described coolant circulation path according to the second embodiment, i.e., the coolant circulation path between the inverters 11 and 12 and the in-wheel motors 21-24 shown in FIG. 2, is also applied to third to eighth embodiments, which will be described below.

Connection of the inverters 11 and 12 in parallel and connection of the in-wheel motors 21-24 in series by the coolant circulation lines 100, 100a, and 100b are intended to consider well resistances of the respective devices. That is, the inverters 10a and 10b or 11 and 12, which are installed upstream on the coolant circulation path compared to the in-wheel motors 21-24 based on the water pump 121 and are configured such that relatively high well resistance is applied thereto, are connected in parallel by the coolant circulation lines 100, 100a, and 100b so that the coolant may be distributed to the plurality of inverters 10a and 10b or 11 and 12 and pass through the plurality of inverters 10a and 10b or 11 and 12. On the other hand, the in-wheel motors 21-24 are connected in series by the coolant circulation line 100 so that the coolant may sequentially pass through the plurality of in-wheel motors 21-24.

Figure 3:
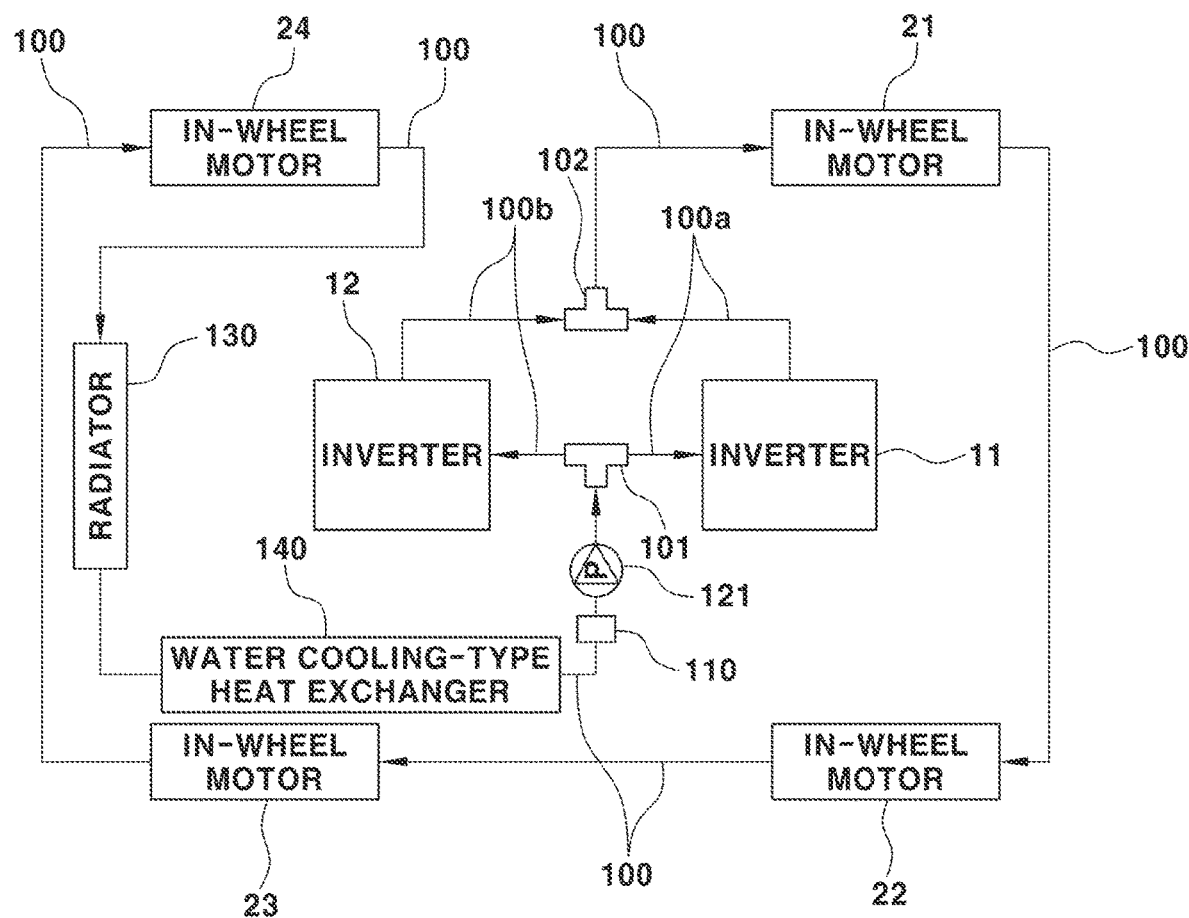
FIG. 3 is a circuit diagram showing a cooling system for in-wheel motor vehicles according to a third embodiment of the present invention.
Figure 4:
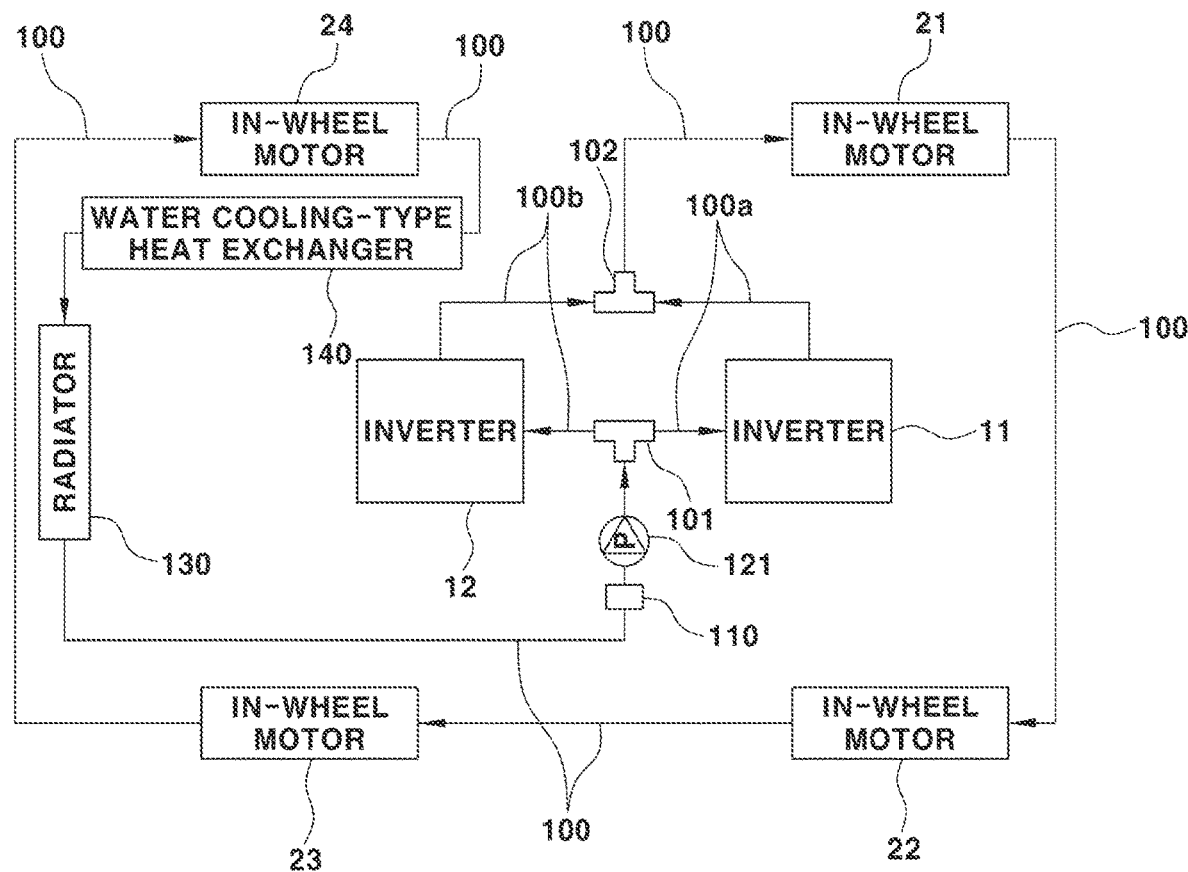
FIG. 4 is a circuit diagram showing a cooling system for in-wheel motor vehicles according to a fourth embodiment of the present invention.

Next, FIG. 3 is a circuit diagram showing a cooling system for in-wheel motor vehicles according to a third embodiment of the present invention, and FIG. 4 is a circuit diagram showing a cooling system for in-wheel motor vehicles according to a fourth embodiment of the present invention.

As shown in FIGS. 3 and 4, the cooling systems according to the third and fourth embodiments further include a water cooling-type heat exchanger 140 which exchanges heat between the refrigerant and the coolant.

The water cooling-type heat exchanger 140 is provided between the refrigerant circulation line (not shown) of an air conditioning system and a heat pump system and the coolant circulation line 100 of the PE cooling circuit and performs heat exchange between the refrigerant on the refrigerant circulation line and the coolant on the coolant circulation line 100.

In the third embodiment shown in FIG. 3, the water cooling-type heat exchanger 140 is installed on the coolant circulation line 100 at an outlet of the radiator 130 (at a downstream side of the radiator 130 based on the coolant circulation path), and the coolant having exchanged heat with air in the radiator 130 passes through the water cooling-type heat exchanger 140.

The coolant having exchanged heat with air (external air inhaled by a cooling fan which is not shown) in the radiator 130 exchanges heat with the refrigerant while passing through the water cooling-type heat exchanger 140 and is pumped by the water pump 121 so as to be circulated along the coolant circulation lines 100, 100a, and 100b.

In the fourth embodiment shown in FIG. 4, the water cooling-type heat exchanger 140 is installed on the coolant circulation line 100 at an inlet of the radiator 130 (at an upstream side of the radiator 130 based on the coolant circulation path), and the coolant flowing towards the radiator 130 exchanges heat with the refrigerant while passing through the water cooling-type heat exchanger 140.

The coolant having passed through the water cooling-type heat exchanger 140 exchanges heat with air while passing through the radiator 130, and thereafter, is pumped by the water pump 121 so as to be circulated along the coolant circulation lines 100, 100a, and 100b.

Figure 5:
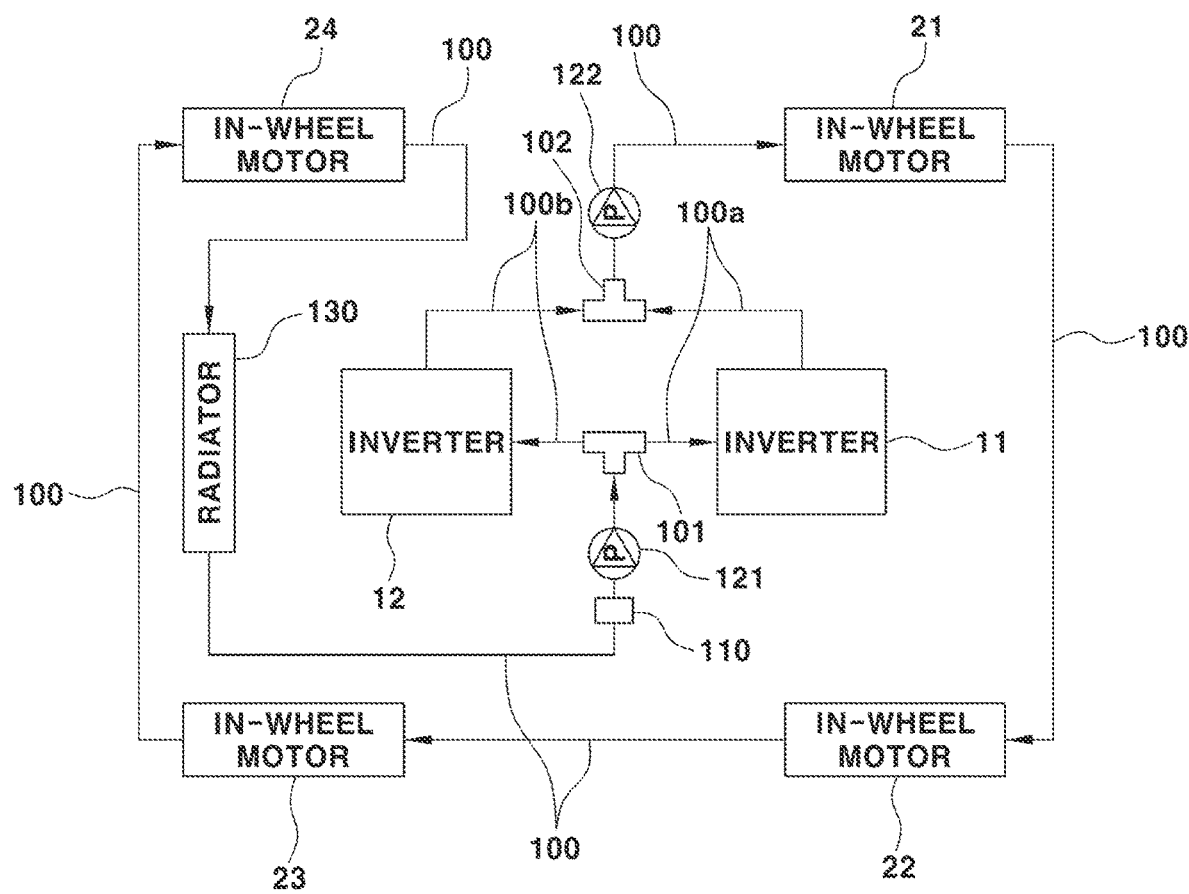
FIG. 5 is a circuit diagram showing a cooling system for in-wheel motor vehicles according to a fifth embodiment of the present invention.
Figure 6:
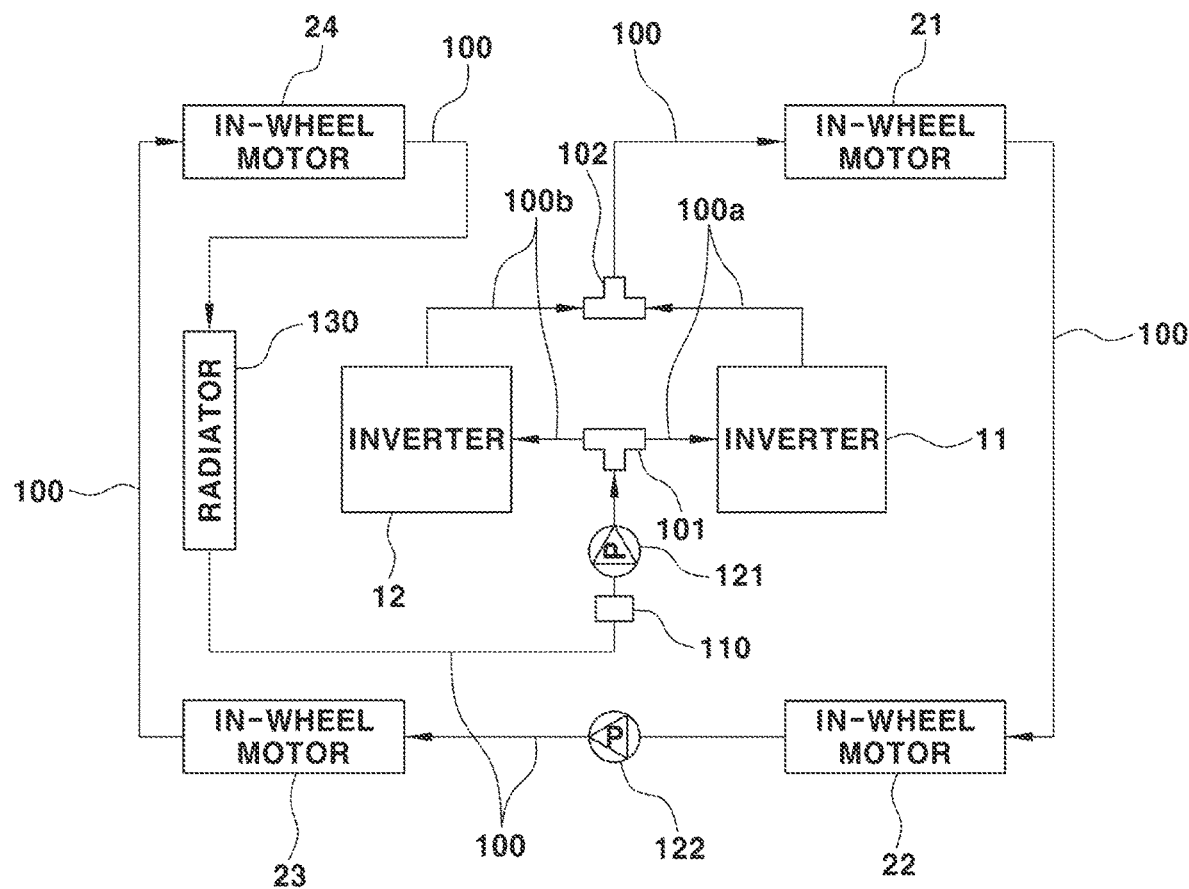
FIG. 6 is a circuit diagram showing a cooling system for in-wheel motor vehicles according to a sixth embodiment of the present invention.

Next, FIG. 5 is a circuit diagram showing a cooling system for in-wheel motor vehicles according to a fifth embodiment of the present invention, and FIG. 6 is a circuit diagram showing a cooling system for in-wheel motor vehicles according to a sixth embodiment of the present invention.

The cooling systems according to the fifth and sixth embodiments include a plurality of water pumps 121 and 122. The water pump 121 may be installed on the coolant circulation line 100 located at the upstream sides of the inverters 11 and 12 in the same manner as in the first to fourth embodiments, and the water pump 122 may be additionally installed on the coolant circulation line 100 located at the downstream sides of the inverters 11 and 12 so as to connect the plurality of in-wheel motors 21-24 in series.

Hereinafter, the water pump 121 installed on the coolant circulation line 100 located at the upstream sides of the inverters 11 and 12 is referred to as "a first water pump" and the water pump 122 installed on the coolant circulation line 100 located at the downstream sides of the inverters 11 and 12 so as to connect the plurality of in-wheel motors 21-24 in series is referred to as "a second water pump."

The first water pump 121 may be installed on the coolant circulation line 100 located at a downstream side (an outlet) of the radiator 130, i.e., at upstream sides (inlets) of the inverters 11 and 12, in the same manner as in the first to fourth embodiments, and particularly, may be installed on the coolant circulation line 100 located at an upstream side of the first connector 101, i.e., on the coolant circulation line 100 before being branched off into the coolant circulation lines 100a and 100b towards the respective inverters 11 and 12 by the first connector 101.

Further, the second water pump 122 may be installed on the coolant circulation line 100 located at outlets (downstream sides) of the inverters 11 and 12, and particularly, may be installed on the coolant circulation line 100 located at an outlet of the second connector 102, i.e., on the coolant circulation line 100 connected to the in-wheel motor 21 after joining the coolant circulation lines 100a and 100b into the coolant circulation line 100 by the second connector 102.

In the fifth embodiment shown in FIG. 5, the second water pump 122 is installed on the coolant circulation line 100 connected to an inlet of the first in-wheel motor 21 based on the coolant circulation path, among the plurality of in-wheel motors 21-24 connected in series by the coolant circulation line 100. That is, the second water pump 122 is installed on the coolant circulation line 100 between the second connector 102 and the in-wheel motor 21.

Thereby, the coolant is circulated in the path of the reservoir tank 110, the first water pump 121, the first connector 101, the inverters 11 and 12, the second connector 102, the second water pump 122, the in-wheel motor 21 of the rear right wheel, the in-wheel motor 22 of the rear left wheel, the in-wheel motor 23 of the front left wheel, the in-wheel motor 24 of the front right wheel, and the radiator 130.

In the sixth embodiment shown in FIG. 6, the second water pump 122 is installed on the coolant circulation line 100 between the in-wheel motors 23 and 24 of the front wheels and the in-wheel motors 21 and 22 of the rear wheels. That is, as shown in FIG. 6, the second water pump 122 is installed on the coolant circulation line 100 between the in-wheel motor 22 of the rear left wheel and the in-wheel motor 23 of the front left wheel.

Installation of the second water pump 122 is intended to consider a long length of the coolant circulation line 100 between the in-wheel motors 21 and 22 of the rear wheels and the in-wheel motors 23 and 24 of the front wheels. Concretely, because well resistance between the front and rear wheels is increased as the length of the coolant circulation line 100 connecting the in-wheel motor 22 of the rear left wheel and the in-wheel motor 23 of the front left wheel is increased, the second water pump 122 is installed on the coolant circulation line 100 between the in-wheel motor 22 of the rear left wheel and the in-wheel motor 23 of the front left wheel in consideration of such a high well resistance.

Figure 7:
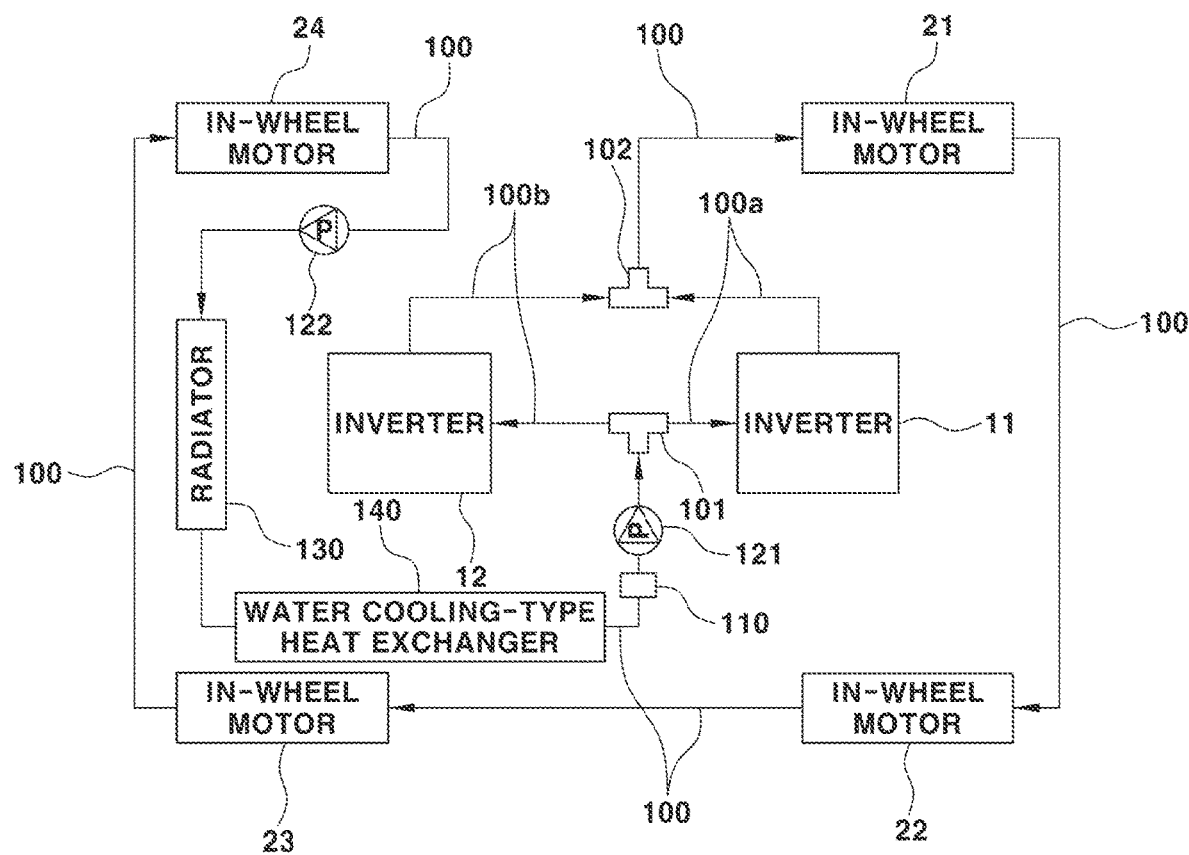
FIG. 7 is a circuit diagram showing a cooling system for in-wheel motor vehicles according to a seventh embodiment of the present invention.
Figure 8:
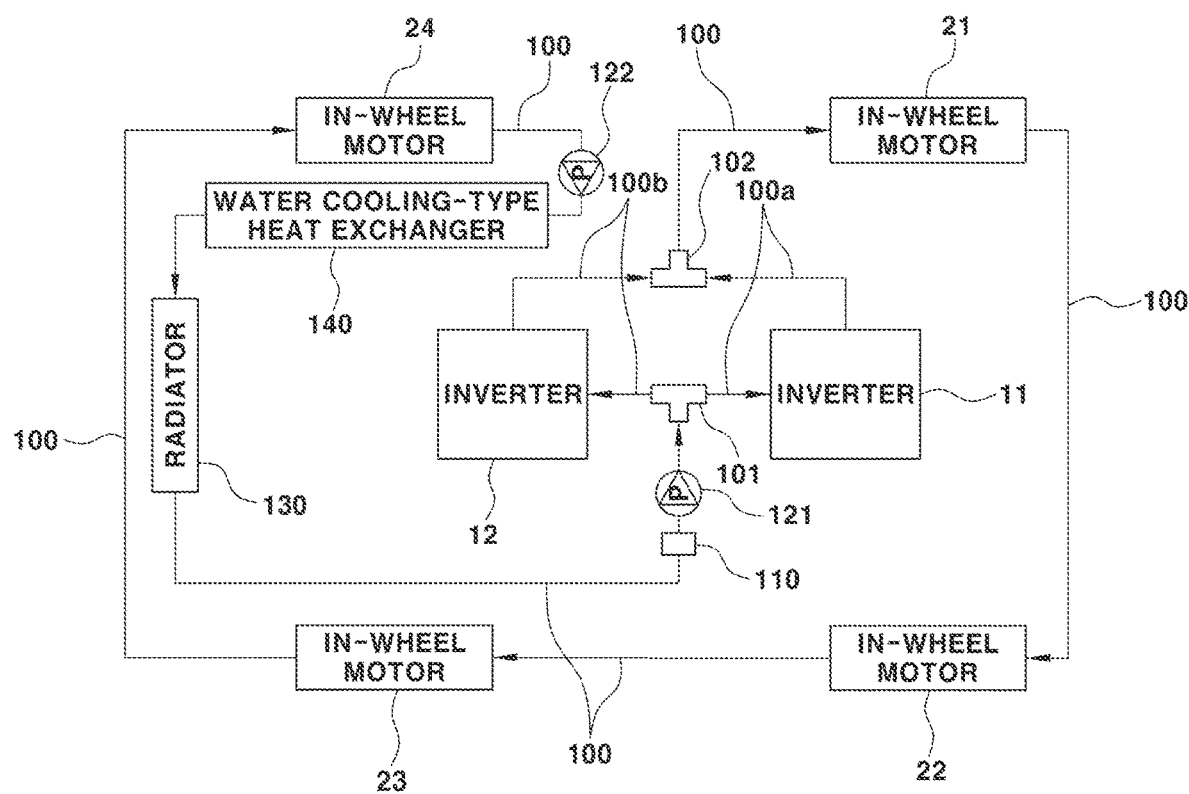
FIG. 8 is a circuit diagram showing a cooling system for in-wheel motor vehicles according to an eighth embodiment of the present invention.

Further, FIG. 7 is a circuit diagram showing a cooling system for in-wheel motor vehicles according to a seventh embodiment of the present invention, and FIG. 8 is a circuit diagram showing a cooling system for in-wheel motor vehicles according to an eighth embodiment of the present invention.

The cooling system according to the seventh embodiment shown in FIG. 7 further includes the second water pump 122 in addition to the configuration of the cooling system according to the third embodiment shown in FIG. 3, and the cooling system according to the eighth embodiment shown in FIG. 8 further includes the second water pump 122 in addition to the configuration of the cooling system according to the fourth embodiment shown in FIG. 4.

In both the seventh embodiment and the eighth embodiment, the second water pump 122 is installed at an upstream side (i.e., a front end or an inlet) of the radiator 130 or the water cooling-type heat exchanger 140 in consideration of an increase in well resistance due to addition of the water cooling-type heat exchanger 140.

In the seventh embodiment, the second water pump 122 is installed on the coolant circulation line 100 at the upstream side of the radiator 130 in consideration of an increase in well resistance due to addition of the water cooling-type heat exchanger 140 to the downstream side of the radiator 130 as in the third embodiment.

In the eighth embodiment, the second water pump 122 is installed on the coolant circulation line 100 at the upstream side (the inlet) of the water cooling-type heat exchanger 140 radiator 130 in consideration of an increase in well resistance due to addition of the water cooling-type heat exchanger 140 to the upstream side of the radiator 130.

Figure 9:
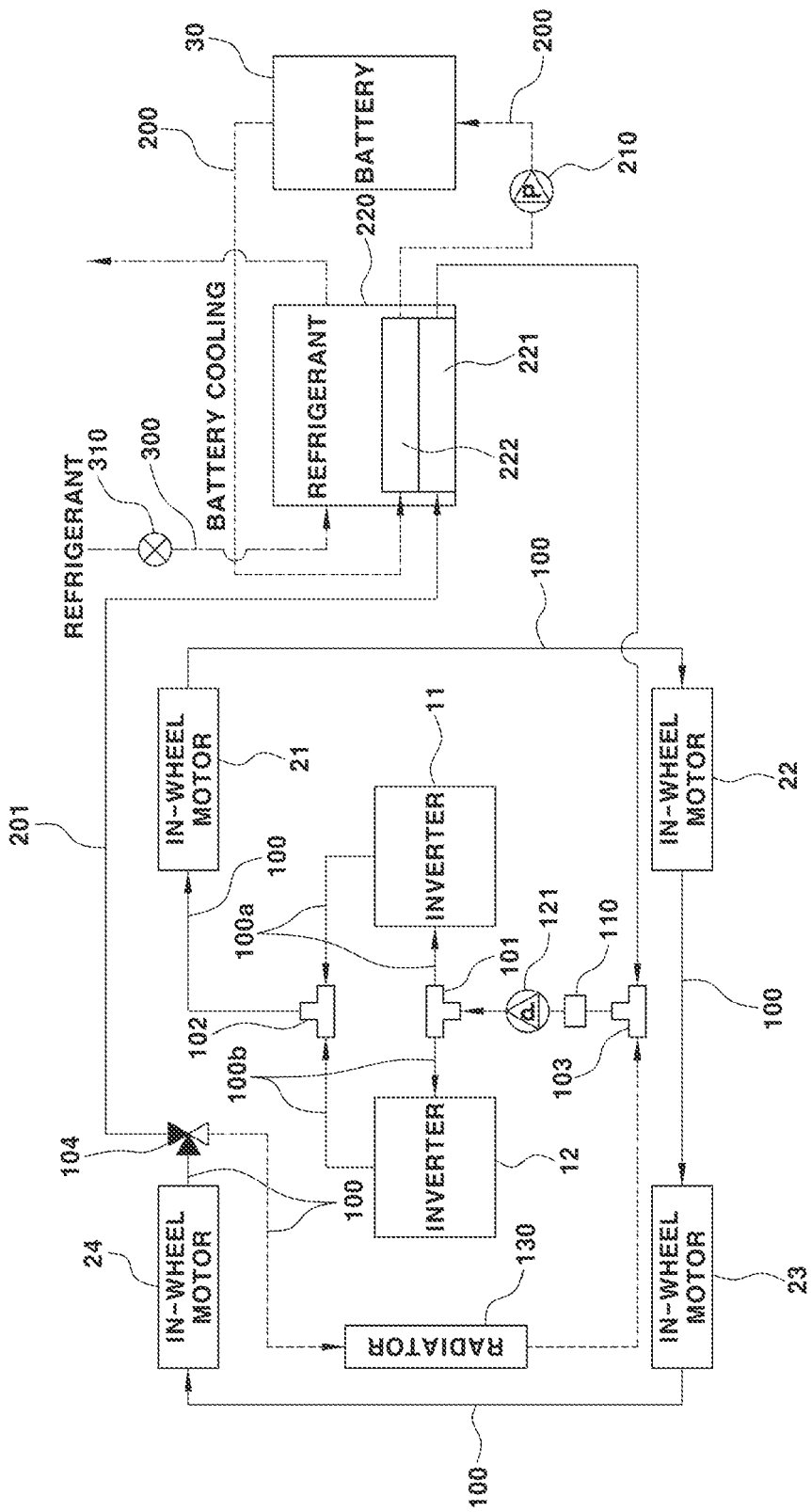
FIG. 9 is a circuit diagram showing a cooling system for in-wheel motor vehicles according to a ninth embodiment of the present invention.

Further, FIG. 9 is a circuit diagram showing a cooling system for in-wheel motor vehicles according to a ninth embodiment of the present invention, and the cooling system further includes a battery cooling circuit.

As shown in this figure, the cooling system according to the ninth embodiment further includes the battery cooling circuit in addition to the configuration of the cooling system according to the second embodiment shown in FIG. 2. Further, cooling systems may be obtained by adding the battery cooling circuit, which will be described below, to the configurations of the cooling systems according to the first and third to eighth embodiments.

Hereinafter, the configuration of the cooling system, which includes the battery cooling circuit in addition to the configuration of the cooling system according to the second embodiment, will be described, and the cooling systems, which further include the battery cooling circuit in addition to the configurations of the cooling systems according to the first and third to eighth embodiments, are the same as the cooling system according to the ninth embodiment except that the battery cooling circuit is added to the configurations of the cooling systems according to the respective embodiments, and a detailed description thereof will thus be omitted.

However, it is to be understood that the cooling systems, which further include the battery cooling circuit in addition to the configurations of the cooling systems according to the first and third to eighth embodiments, will become apparent to those skilled in the art upon reading the following description of the ninth embodiment.

The cooling system according to the ninth embodiment of the present invention includes the PE cooling circuit configured to cool the in-wheel motors 21-24 and the inverters 11 and 12 and the battery cooling circuit configured to cool the battery 30 which supplies power to the in-wheel motors 21-24 and the inverters 11 and 12.

The PE cooling circuit serves to cool electrical and electronic components mounted in the vehicle, such as the in-wheel motors 21-24 and the inverters 11 and 12, the configuration of the PE cooling circuit is the same as the configuration of the PE cooling circuit in the second embodiment shown in FIG. 2, and an additional description thereof will thus be omitted.

The battery cooling circuit includes a coolant flow path (not shown) provided in the battery 30 such that the coolant may pass therethrough, and the coolant flow path of the battery 30 is provided such that the coolant passing through the inside of the coolant flow path may cool the battery 30, i.e., may absorb heat generated by the battery 30.

Further, the battery cooling circuit may further include a chiller 220 configured such that an air conditioner refrigerant passes therethrough and a coolant circulation line 200 configured to connect the battery 30 and the chiller 220 such that the coolant may be circulated therebetween.

Moreover, the battery cooling circuit may further include a separate water pump 210 configured to pump the coolant in the coolant circulation line 200 so as to circulate the coolant. The water pump 210 of the battery cooling circuit may also be an electric water pump operated by power supplied from the battery 30, and the water pump 210 is provided such that operation thereof may be controlled by a control signal from the controller, which is not shown.

The chiller 220 is a heat exchanger which performs heat exchange between the coolant and the refrigerant, and a connection line 201 branched off from the coolant circulation line 100 of the PE cooling circuit, the coolant circulation line 200 of the battery cooling circuit, and a refrigerant line 300 are connected to the chiller 220 so as to perform heat exchange between the coolant and the refrigerant.

The refrigerant line 300 configured such that the refrigerant may pass through the chiller 220 may be branched off from a main refrigerant line (not shown) of the air conditioning system and is connected to a refrigerant inlet and a refrigerant outlet of the chiller 220, respectively. Therefore, while the refrigerant distributed from the main refrigerant line of the air conditioning system flows along the refrigerant line 300, the refrigerant may pass through the chiller 220.

Further, an expansion valve 310, which receives the refrigerant in a high-temperature and high-pressure state compressed by the compressor (not shown) of the air conditioning system and expands the refrigerant to a low-temperature and low-pressure state, may be installed on the refrigerant line 300 connected to the refrigerant inlet of the chiller 220.

Thereby, the refrigerant in the low-temperature and low-pressure state having passed through the expansion valve 310 may be supplied to the chiller 220 through the refrigerant line 300. Further, the refrigerant supplied to the chiller 220 exchanges heat with the coolant while passing through the chiller 220.

A heat exchange passage configured to pass the coolant therethrough so as to perform heat exchange with the refrigerant is provided in the chiller 220, and the heat exchange passage includes a first heat exchange path 221 to which the connection line 201 branched off from the coolant circulation line 100 of the PE cooling circuit is connected and a second heat exchange path 222 to which the coolant circulation line 200 of the battery cooling circuit is connected.

The connection line 201 of the PE cooling circuit is branched off from the coolant circulation line 100 located at the front end (the upstream side or the inlet) of the radiator 130 and is connected to the coolant inlet (the inlet of the first heat exchange path 221) of the chiller 220, and the connection line 201 connected to the coolant outlet (the outlet of the first heat exchange path 221) of the chiller 220 is connected to the coolant circulation line 100 located at the rear end (the downstream side or the outlet) of the radiator 130 by a third connector 103 so as to be joined to the coolant circulation line 100.

A three-way valve 104 having an opening state controlled by the controller (not shown) is installed at a branch point where the connection line 201 is branched off from the coolant circulation line 100 located at the front end of the radiator 130.

The three-way valve 104 serves to control flow of the coolant and particularly to control flow of the coolant along the coolant circulation line 100 connected to the radiator 130 and the connection line 201 connected to the chiller 220.

For example, when an inner passage of the three-way valve 104, to which the coolant circulation line 100 connected to the radiator 130 is connected, is opened, the coolant having passed through the three-way valve 104 flows towards the radiator 130 through the coolant circulation line 100, and, when an inner passage of the three-way valve 104, to which the connection line 201 connected to the chiller 220 is connected, is opened, the coolant having passed through the three-way valve 104 flows towards the chiller 220 through the connection line 201.

Further, because the three-way valve 104 is installed on the coolant circulation line 100 located at the front end of the radiator 130, the high-temperature coolant having absorbed heat from the inverters 11 and 12 and the in-wheel motors 21-24 while cooling the corresponding devices passes through the three-way valve 104.

When the inner passage of the three-way valve 104, to which the connection line 201 connected to the chiller 220 is connected, is opened, the high-temperature coolant flows towards the connection line 201, and the high-temperature coolant flowing along the connection line 201 passes through the first heat exchange path 221 of the chiller 220.

The high-temperature coolant in the chiller 220 may exchange heat with the air conditioner refrigerant while passing through the first heat exchange path 221, and thus, heat of the coolant may be transferred to the air conditioner refrigerant having a relatively low temperature. Thereby, the three-way valve 104 and the connection line 201 function as components of the heat pump system.

Thereafter, the coolant having passed through the first heat exchange path 221 of the chiller 220 flows along the connection line 201 and is joined to the coolant on the coolant circulation line 100 located at the rear end (the downstream side or the outlet) of the radiator 130 by the third connector 103.

In this way, in the PE cooling circuit, the coolant having cooled the in-wheel motors 21-24 and the inverters 11 and 12 flows towards the connection line 201 through the three-way valve 104, is supplied to the chiller 220, is cooled by the refrigerant in the chiller 220, and is then circulated to the coolant circulation line 100 by the water pump 121 so as to again cool the in-wheel motors 21-24 and the inverters 11 and 12.

In the same manner, in the battery cooling circuit, the coolant having cooled the battery 30 is supplied to the chiller 220, is cooled by the refrigerant in the chiller 220, and is then circulated to the coolant circulation line 200 by the water pump 210 so as to again cool the battery 30.

The cooling systems according to the respective embodiments of the present invention were described as above.

As described above, in the cooling system according to embodiments of the present invention, the plurality of inverters 10a and 10b or 11 and 12 is connected in parallel by the coolant circulation lines 100a and 100b with respect to other components, such as the in-wheel motors 21 and 22 or 21-24, the radiator 130, and the water pump 121. Further, the plurality of in-wheel motors 21 and 22 or 21-24 is connected in series by the coolant circulation line 100 with respect to the other components.

Therefore, the cooling system according to embodiments of the present invention has an inverter parallel circuit configuration so that the coolant is distributed towards the plurality of inverters 10a and 10b or 11 and 12 and passes through the inverters 10a and 10b or 11 and 12 in parallel and an in-wheel motor series circuit configuration so that the coolant passes through the plurality of in-wheel motors 21-24 in series.

In the inverter parallel circuit configuration according to one embodiment of the present invention, well resistance of the cooling system may be reduced, and accordingly, cooling performance of the cooling system may be improved due to an increase in the flow rate of the coolant in the in-wheel motors 21 and 22 or 21-24 and the radiator 130.

That is, in embodiments of the present invention, the coolant is distributed towards the plurality of inverters 10a and 10b or 11 and 12 and passes through the inverters 10a and 10b or 11 and 12 in parallel, and thus, well resistance of the cooling system may be reduced and, particularly, improvement in inverter cooling performance of the cooling system caused by reduction in well resistance in the inverters 10a and 10b or 11 and 12 is expected (with reference to FIGS. 1 to 9).

Further, in embodiments of the present invention, because, by the in-wheel motor series circuit configuration, the flow rates of the coolant respectively having passed through the inverters 10a and 10b or 11 and 12 are joined and the sum total of the flow rates of the coolant passes through the in-wheel motors 21-24 having a large heat generation amount and the radiator 130 requiring a high heat dissipation amount (with reference to FIGS. 1 to 8), the flow rate of the coolant in the in-wheel motors 21-24 and the radiator 130 may be increased, and accordingly, the heat absorption amount in the in-wheel motors 21-24 and the heat dissipation amount in the radiator 130 may be increased, thereby being capable of improving the cooling performance of the cooling system.

In the inverter parallel circuit configuration according to one embodiment of the present invention, one water pump 121 may be installed as in the embodiments shown in FIGS.

1 to 4 or a plurality of water pumps 121 and 122 may be installed as in the embodiments shown in FIGS. 5 to 8 depending on the required flow rate of the coolant.

Further, although the respective embodiments shown in FIGS. 5 to 8 illustrate that two water pumps 121 and 122 are disposed in series along the coolant circulation line 100, the two water pumps 121 and 122 may be disposed in parallel on the coolant circulation line 100.

That is, although the respective embodiments shown in FIGS. 2, 3, 4, and 9 illustrate that one water pump 121 is installed at the inlet (the upstream side) of the first connector 101, one water pump may be installed on each of the two coolant circulation lines 100a and 100b at the outlet of the first connector 101, other than at the inlet of the first connector 101. One water pump may be installed on each of the coolant circulation lines 100a and 100b between the first connector 101 and the respective inverters 10a and 10b or 11 and 12.

As is apparent from the above description, a cooling system for in-wheel motor vehicles according to embodiments of the present invention may effectively cool in-wheel motors mounted in respective wheels of a vehicle together with inverters using a coolant.

Particularly, in an inverter parallel circuit configuration according to one embodiment of the present invention, well resistance of the cooling system may be reduced, and cooling performance of the cooling system may be improved due to increase in a flow rate of the coolant in the in-wheel motors and a radiator.

Further, because flow rates of the coolant respectively having passed through the inverters may be joined and the sum total of the flow rates of the coolant may pass through the in-wheel motors having a large heat generation amount and the radiator requiring a high heat dissipation amount, the flow rate of the coolant in the in-wheel motors and the radiator may be increased, and accordingly, the heat absorption amount in the in-wheel motors and the heat dissipation amount in the radiator may be increased, thereby being capable of improving the cooling performance of the cooling system.

Embodiments of the invention have been described in detail with reference to preferred embodiments thereof. However, it will be appreciated by those skilled in the art that changes may be made in these embodiments without departing from the principles and spirit of embodiments of the invention, the scope of which is defined in the appended claims and their equivalents.

What is claimed is:

1. A cooling system for in-wheel motor vehicles, the cooling system comprising:
    first coolant flow paths provided in a plurality of in-wheel motors mounted in wheels of a vehicle;
    second coolant flow paths provided in a plurality of inverters configured to drive and control the plurality of in-wheel motors;
    a radiator configured to pass therethrough a coolant having cooled the plurality of inverters and the plurality of in-wheel motors so as to dissipate heat from the coolant;
    a coolant circulation line connecting the second coolant flow paths, the first coolant flow paths, and the radiator and configured to circulate the coolant through the second coolant flow paths, the first coolant flow paths, and the radiator, wherein a portion of the coolant circulation line located at upstream sides of the plurality of inverters based on a coolant circulation path is branched off into secondary coolant circulation lines connected to respective inverters of the plurality of inverters; and
    water pumps disposed on the coolant circulation line, the water pumps being configured to pump the coolant in the coolant circulation line so as to circulate the coolant along the coolant circulation line, wherein the coolant pumped by the water pumps is distributed and passes through the plurality of inverters in parallel by way of the secondary coolant circulation lines.

2. The cooling system of claim 1, wherein:
    the secondary coolant circulation lines are joined back into the coolant circulation line at downstream sides of the plurality of inverters; and
    the plurality of in-wheel motors is connected in series by the coolant circulation line such that the coolant having passed through the plurality of inverters in parallel sequentially passes through the plurality of in-wheel motors mounted in the wheels of the vehicle while being circulated along the coolant circulation line.

3. The cooling system of claim 2, wherein:
    the coolant circulation line connecting the plurality of in-wheel motors in series is connected to the radiator; and
    the radiator is disposed at downstream sides of the plurality of in-wheel motors based on the coolant circulation path.

4. The cooling system of claim 2, wherein:
    the plurality of in-wheel motors comprises an in-wheel motor of a left wheel of the vehicle and an in-wheel motor of a right wheel of the vehicle,
    the plurality of inverters comprises a left wheel inverter configured to drive and control the in-wheel motor of the left wheel, and a right wheel inverter configured to drive and control the in-wheel motor of the right wheel.

5. The cooling system of claim 2, wherein:
    the wheels of the vehicle comprise front wheels and rear wheels;
    the plurality of in-wheel motors comprises in-wheel motors of the front wheels and in-wheel motors of the rear wheels; and
    the plurality of inverters comprises a front wheel inverter configured to drive and control the in-wheel motors of the front wheels and a rear wheel inverter configured to drive and control the in-wheel motors of the rear wheels.

6. The cooling system of claim 5, wherein:
    the front wheels comprise a front left wheel and a front right wheel;
    the in-wheel motors of the front wheels comprise an in-wheel motor of the front left wheel and an in-wheel motor of the front right wheel;
    the rear wheels comprise a rear left wheel and a rear right wheel; and
    the in-wheel motors of the rear wheels comprise an in-wheel motor of the rear left wheel and an in-wheel motor of the rear right wheel.

7. The cooling system of claim 5, wherein the water pumps comprise:
    a first water pump disposed at upstream sides of the plurality of inverters; and
    a second water pump disposed on the coolant circulation line between the in-wheel motors of the front wheels and the in-wheel motors of the rear wheels.

8. The cooling system of claim 2, wherein the water pumps comprise:

a first water pump disposed at upstream sides of the plurality of inverters; and a second water pump disposed at downstream sides of the plurality of inverters and configured to pump the coolant having passed through the plurality of inverters.

9. The cooling system of claim 2, further comprising a water cooling-type heat exchanger configured to perform heat exchange between the coolant circulated along the coolant circulation line and a refrigerant circulated along a refrigerant circulation line of an air conditioning system and a heat pump system.

10. The cooling system of claim 9, wherein the water pumps comprise:

a first water pump disposed at upstream sides of the plurality of inverters; and a second water pump disposed on the coolant circulation line at an upstream side of the water cooling-type heat exchanger.

11. The cooling system of claim 9, wherein the water cooling-type heat exchanger is disposed at an upstream side of the radiator.

12. The cooling system of claim 11, wherein the water pumps comprise:

a first water pump disposed at upstream sides of the plurality of inverters; and a second water pump disposed on the coolant circulation line at an upstream side of the water cooling-type heat exchanger.

13. The cooling system of claim 9, wherein the water cooling-type heat exchanger is disposed at a downstream side of the radiator.

14. The cooling system of claim 13, wherein the water pumps comprise:

a first water pump disposed at upstream sides of the plurality of inverters; and a second water pump disposed on the coolant circulation line at an upstream side of the radiator.

15. The cooling system of claim 1, wherein the water pumps are provided on the secondary coolant circulation lines, respectively.

16. A cooling system for in-wheel motor vehicles, the cooling system comprising:

first coolant flow paths provided in a plurality of in-wheel motors mounted in wheels of a vehicle;

second coolant flow paths provided in a plurality of inverters configured to drive and control the plurality of in-wheel motors;

a radiator configured to pass therethrough a coolant having cooled the plurality of inverters and the plurality of in-wheel motors so as to dissipate heat from the coolant;

a coolant circulation line connecting the second coolant flow paths, the first coolant flow paths, and the radiator and configured to circulate the coolant through the second coolant flow paths, the first coolant flow paths, and the radiator, wherein a portion of the coolant circulation line located at upstream sides of the plurality of inverters based on a coolant circulation path is branched off into secondary coolant circulation lines connected to respective inverters of the plurality of inverters;

water pumps disposed on the coolant circulation line, the water pumps being configured to pump the coolant in the coolant circulation line so as to circulate the coolant along the coolant circulation line, wherein the coolant pumped by the water pumps is distributed and passes through the plurality of inverters in parallel by way of the secondary coolant circulation lines;

a connection line branched off from the coolant circulation line at an upstream side of the radiator, wherein the connection line is connected to a chiller;

a three-way valve provided at a branch point where the connection line is branched off from the coolant circulation line, wherein the three-way valve is configured to allow the coolant to flow in one direction towards the radiator or the chiller; and a refrigerant line connected to the chiller and configured to allow an air conditioner refrigerant to pass through the chiller, wherein the chiller is configured to perform heat exchange between the air conditioner refrigerant introduced into the chiller through the refrigerant line and the coolant introduced into the chiller through the connection line in the chiller.

17. The cooling system of claim 16, further comprising a third coolant circulation line of a battery cooling circuit connected to the chiller, wherein the battery cooling circuit is configured to cool a battery, and wherein the chiller is configured to perform heat exchange between a second coolant circulated along the third coolant circulation line of the battery cooling circuit and the air conditioner refrigerant in the chiller.

18. The cooling system of claim 16, further comprising an expansion valve disposed on the refrigerant line and configured to expand the air conditioner refrigerant that is introduced into the chiller.

19. A vehicle comprising:

a vehicle body;

a plurality of wheels coupled to the vehicle body, the plurality of wheels comprising front wheels and rear wheels;

a plurality of in-wheel motors respectively mounted in the plurality of wheels, wherein first coolant flow paths are provided in the plurality of in-wheel motors;

a plurality of inverters configured to drive and control the plurality of in-wheel motors, wherein second coolant flow paths are provided in the plurality of inverters;

a radiator configured to pass therethrough a coolant having cooled the plurality of inverters and the plurality of in-wheel motors so as to dissipate heat from the coolant;

a coolant circulation line connecting the second coolant flow paths, the first coolant flow paths, and the radiator and configured to circulate the coolant through the second coolant flow paths, the first coolant flow paths, and the radiator, wherein:

the coolant circulation line comprises a single coolant circulation line and secondary coolant circulation lines that branch from the single coolant circulation line at a branch point located at upstream sides of the plurality of inverters based on a coolant circulation path;

the secondary coolant circulation lines are connected to respective inverters of the plurality of inverters; and the secondary coolant circulation lines merge back into the single coolant circulation line at a joining point located at downstream sides of the plurality of inverters based on the coolant circulation path; and water pumps disposed on the coolant circulation line, the water pumps being configured to pump the coolant in the coolant circulation line so as to circulate the coolant along the coolant circulation line, wherein the coolant pumped by the water pumps is distributed and passes through the plurality of inverters in parallel by way of the secondary coolant circulation lines and is distributed and passes through the plurality of in-wheel motors in series by way of the single coolant circulation line.

20. The vehicle of claim 19, further comprising a water cooling-type heat exchanger configured to perform heat exchange between the coolant circulated along the coolant circulation line and a refrigerant circulated along a refrigerant circulation line of an air conditioning system and a heat pump system.

* * * * *